Aug. 31, 1943.  W. R. TUTTLE ET AL  2,328,113
HEATING UNIT ASSEMBLY
Filed Sept. 3, 1938  3 Sheets-Sheet 1
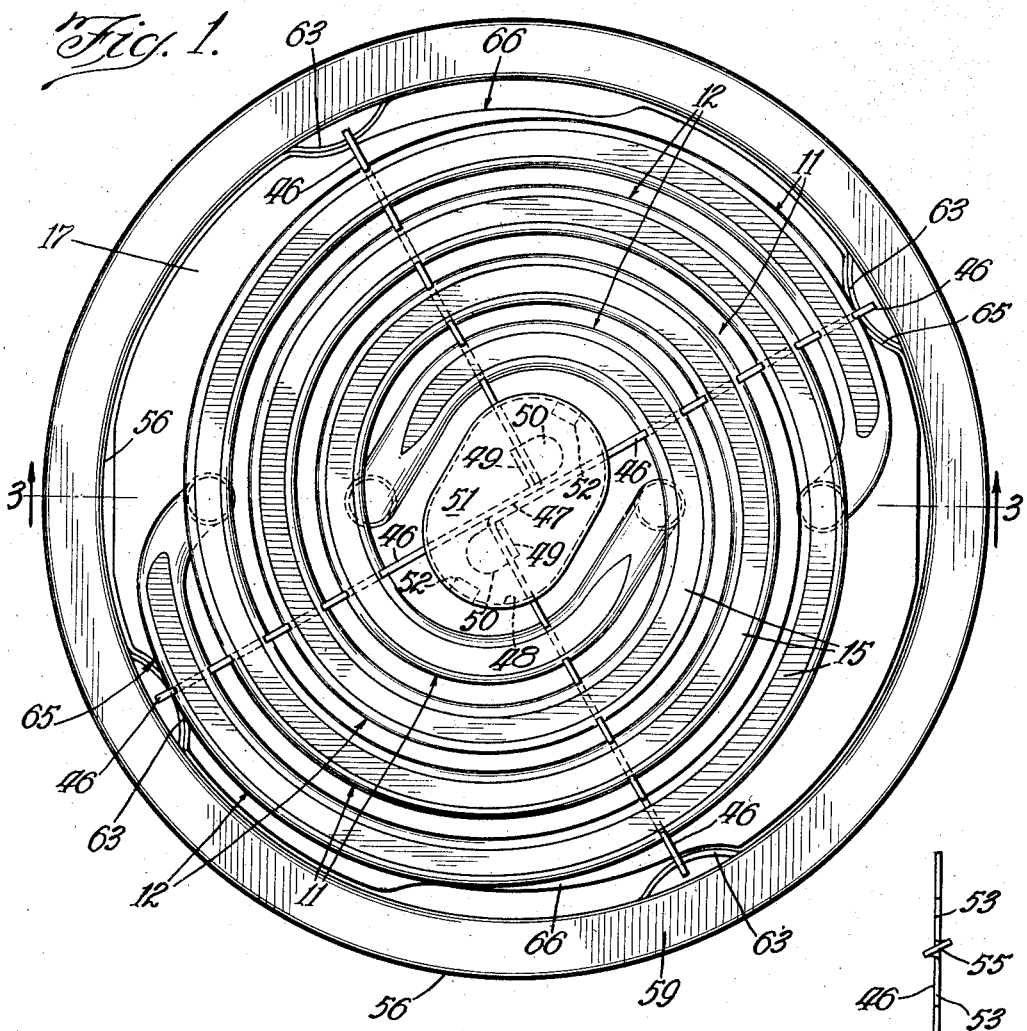
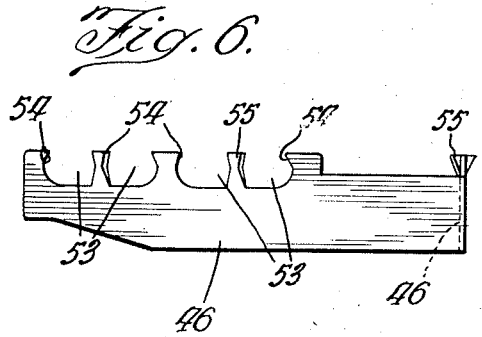
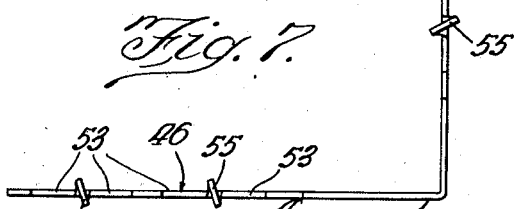
Inventors:
William R. Tuttle
Fred T. Ewald
By Eugene M. Giles Atty.

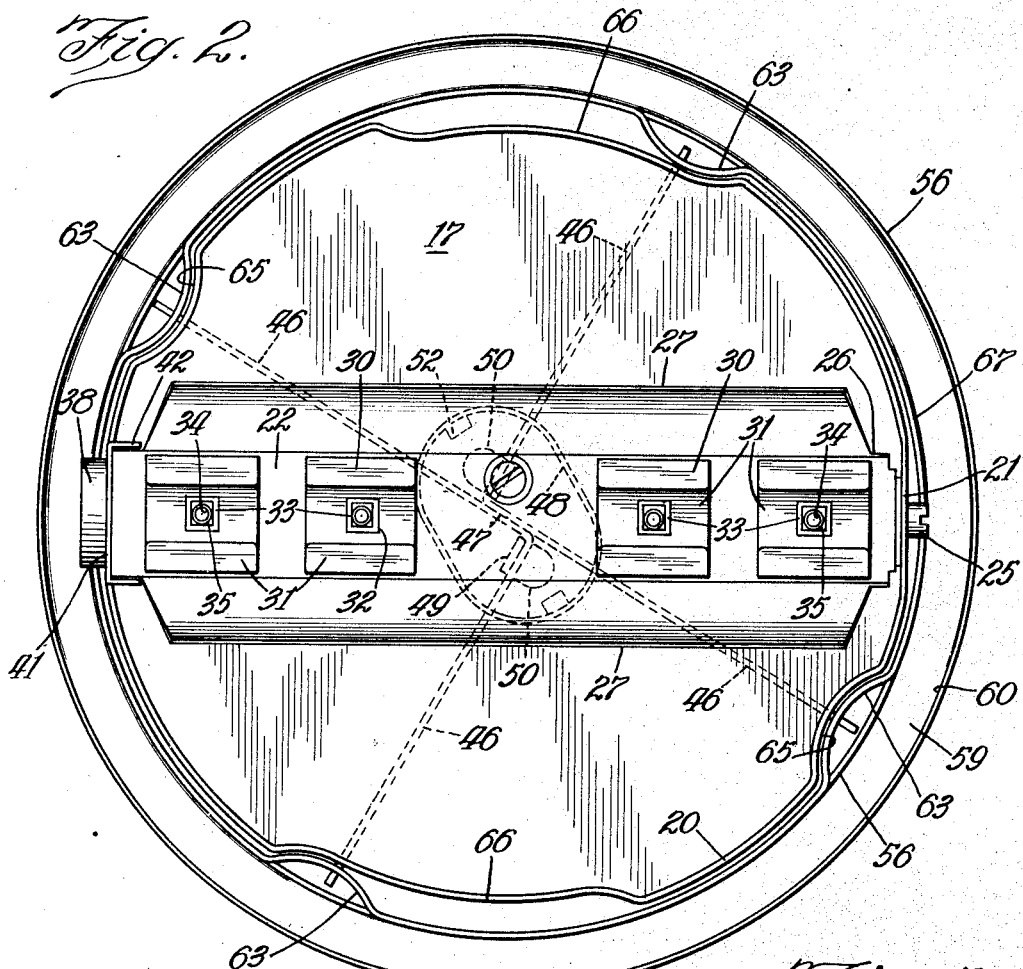
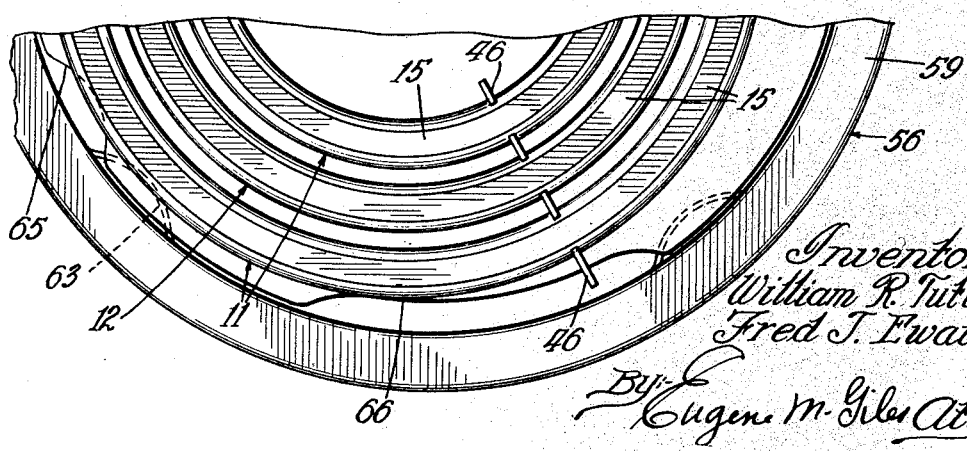

Aug. 31, 1943.   W. R. TUTTLE ET AL   2,328,113
HEATING UNIT ASSEMBLY
Filed Sept. 3, 1938   3 Sheets-Sheet 3

Inventors:
William R. Tuttle
Fred J. Ewald
By Eugene M. Giles Atty.

Patented Aug. 31, 1943

2,328,113

UNITED STATES PATENT OFFICE 2,328,113

HEATING UNIT ASSEMBLY

William R. Tuttle, Riverside, and Fred J. Ewald, Elmhurst, Ill., assignors to Tuttle & Kift, Inc., Chicago, Ill., a corporation of Illinois Application September 3, 1938, Serial No. 228,436

6 Claims. (Cl. 219—37)

Our invention relates to electrical heating units of the type used for cooking or similar purposes and has reference more particularly to facilities whereby the unit is attached to or mounted on the stove or range.

In electric ranges and the like, it is a common practice to employ for cooking purposes a heating unit consisting of one or more sections of resistance wire insulated in a tubular metal sheath which is bent in a flat spiral or other desired form to serve as a support for a pan or other cooking utensil. With such units it is important that the convolutions or other formations of the heating unit should be securely held against displacement, not only so that they will retain the spiral or other form in which they are originally bent but also to avoid any distortion or warping which would prevent intimate contact of the pan or utensil therewith throughout the area of the heating unit. Obviously the convolutions should be secured in place in a manner to leave the top of the unit free of any projections or obstructions which would prevent such contact.

Moreover, it is desirable with such units to employ a heat reflecting surface thereunder to throw the heat upwardly against the bottom of the pan or utensil, or in the case of oven units to throw the heat into the oven compartment, and it is important that this reflector surface and the under side of the heating unit be conveniently accessible for cleaning.

Furthermore the terminals of the heating unit to which conductors are attached should be effectively insulated and safeguarded against accidental or mischievous access and it is also important that these terminals should be arranged to avoid excessive strains thereon or possible injury thereto in attaching the conductors.

The principal objects of our invention are to provide an improved mounting for electrical heating units; to facilitate cleaning of the unit and parts thereunder; to hold the heating unit securely against warping or displacement; to provide improved terminal facilities for attaching conductors to the heating unit; and to insure a simple, convenient and efficient heating unit assembly which may be readily manufactured at a low cost, these and other objects being accomplished as pointed out hereinafter and as shown in the accompanying drawings in which, Figs. 1 and 2 are top and bottom views respectively of a heating unit assembly constructed in accordance with our invention;

Fig. 5 is a fragmentary bottom view showing the parts in the cleaning position of Fig. 4;

Fig. 6 is a side view of one of the supporting arm members to which the heating unit is secured, and Fig. 7 is a top view of the supporting arm member of Fig. 6, both of these figures showing the locking tabs, by which the heating unit is secured thereto, in the initial twisted position to admit the convolutions of the heating unit to the seats in which they are subsequently locked.

Figure 3:
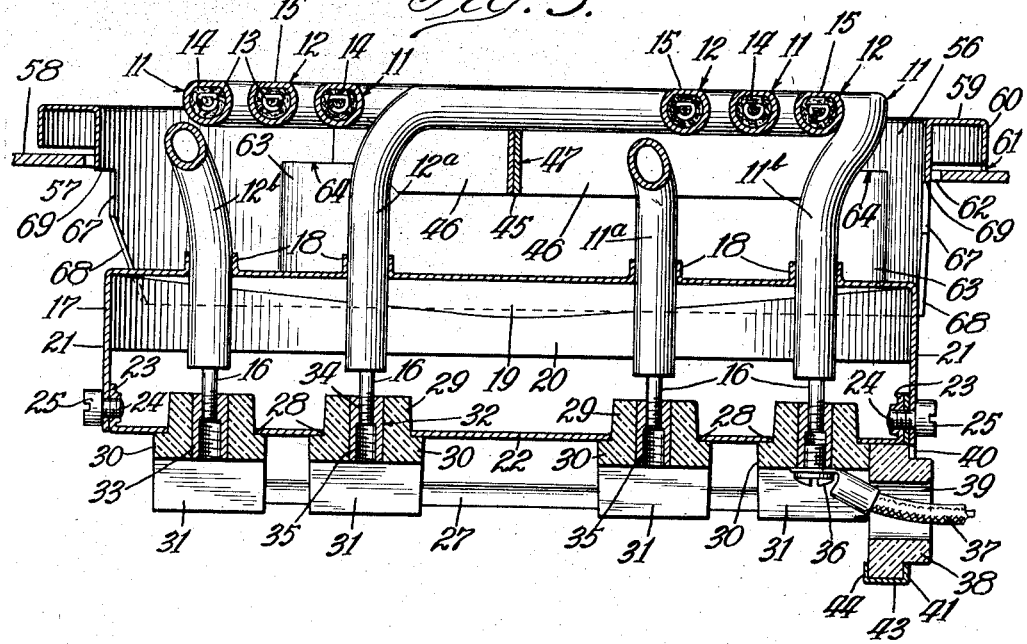
Fig. 3 is a sectional view on the line 3—3 of Fig. 1.
Figure 4:
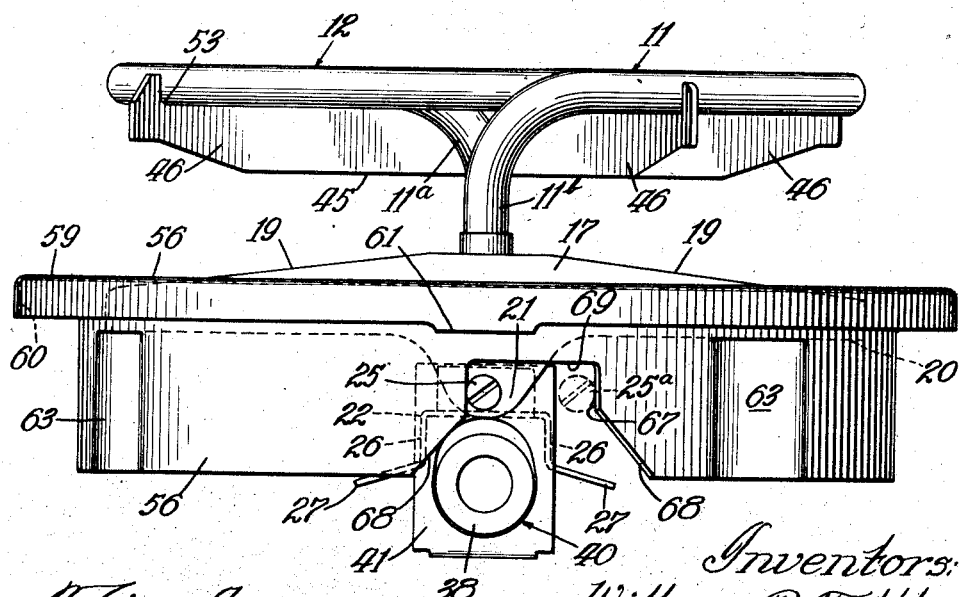
Fig. 4 is a side view of the heating unit assembly showing the heating unit in the elevated position for cleaning.

Referring to the drawings in which we have for the purpose of illustration shown a two part heating unit of the tubular sheathed type above mentioned, the reference numerals 11 and 12 indicate the two parts respectively of the heating unit, each part being of the same flat open spiral form with the convolutions of each located in like manner between and spaced from the convolutions of the other and all lying in the same plane so as to form conjointly a substantially circular heating area and each part 11 and 12 has the ends thereof downturned as shown in Figs. 3 and 4, the downturned ends of the part 11 being indicated at 11$^a$ and 11$^b$ respectively and of the part 12 being indicated at 12$^a$ and 12$^b$ respectively and all these downturned ends being arranged in diametrical alignment across the under side of the heating unit. Each part 11 and 12 is made in a well known manner as shown in Fig. 3 with an elongated helical resistance 13 embedded in heat conductive electrical insulation 14 compacted in a metal tube or sheath 15 and we preferably flatten the tops of the spiral utensil supporting portions of the parts 11 and 12 as indicated at 15 to increase the contact surface presented to the pan or cooking utensil placed thereof and thereby increase the heat conductivity.

Terminals 16 are connected to the ends of the resistance elements 13 and project from the downturned ends 11$^a$, 11$^b$, 12$^a$ and 12$^b$ for attachment of conductors which supply current to energize the resistances 13, suitable controls (not shown) being provided for the conductors whereby the two parts 11 and 12 are connectible individually in parallel or in series with the current supply to give desired variations of heat intensity.

For mounting the parts 11 and 12 of the heating unit a circular plate 17 is provided thereunder which serves also as a heat reflector to throw the heat of the unit 11, 12 upwardly and the downturned ends 11ᵃ, 11ᵇ, 12ᵃ and 12ᵇ which extend through this plate are secured thereto in any convenient manner, as for example by the upturned flanges 18 of the plate 17 which surround and are shrunk onto said downturned ends, said plate 17 being located at a sufficient distance below the coils or convolutions of the heating unit to permit convenient access therebetween for cleaning the under side of the coils or convolutions and the top of the plate.

The plate 17 slopes downwardly at each side of the diametrical zone of the downturned ends 11ᵃ, 11ᵇ, 12ᵃ and 12ᵇ as indicated at 19 in Figs. 3 and 4, and has a depending marginal flange 20 therearound which, at each end of said diametrical zone, has an extension 21 for attachment of a terminal holding plate 22 which extends diametrically under the downturned ends 11ᵃ, 11ᵇ, 12ᵃ and 12ᵇ, said plate 22 having at each end an upturned ear 23 which is secured to the respective extension 21 by a cap screw 24, the head 25 of which projects outwardly beyond the plate flange 20 and the respective extension 21 thereof.

The terminal holding plate 22 is of inverted channel form with depending side flanges 26 each having a sloping wing 27 extending laterally from the lower edge thereof, and directly under each downturned end 11ᵃ, 11ᵇ, 12ᵃ and 12ᵇ said plate 22 is provided with an opening 28, preferably square, for the neck 29, also preferably square, of an insulator 30 of porcelain or other suitable insulating material which fits between the side flanges 26 of the plate 22 and is channeled in the under side as indicated at 31 to provide a laterally skirted recess for protectively accommodating the connection of the respective conductor with the heating unit terminal 16 thereabove.

Each insulator 30 is formed with a square opening 32 extending upwardly therethrough from the recess 31 and containing a square metal fitting 33 with a threaded opening 34 in the upper end into which the lower threaded end of the respective heating unit terminal 16 is engaged and each fitting 33 has a threaded opening 35 in the lower end for a cap screw 36 by which the respective conductor is secured to the fitting and thereby electrically connected with the respective terminal 16 of the heating unit, one only of the conductors being shown herein at 37 and it is to be understood that a similar conductor is in like manner connected with each of the other terminals 16.

In assembling this terminal structure, the plate 22, while unattached, is first inserted between the extensions 21 to which it is subsequently attached and pushed up above the location to be occupied by the insulators 30 and with the downturned ends 11ᵃ, 11ᵇ, 12ᵃ and 12ᵇ projecting through the respective square opening 28. The insulators 30 with their fittings 33 are then threaded onto the threaded ends of the terminals 16 of the heating unit so that their recesses 31 are in alignment, after which the plate 22 is pulled downwardly to engage the square necks 29 of the insulators 30 and secured in place by the cap screws 24. Thus the insulators 30 have a bearing against the plate 22 to withstand pressure applied to the screws 36 in attaching the conductors 37 and moreover, since the square insulators 30 fit between the side flanges 26 of the plate and the square necks 29 thereof fit in square openings 28 of said plate 22, the plate 22 holds the insulators 30 against twisting strains in tightening the screws 36 and the terminals 16 of the heating unit are safeguarded against pressure or twisting which might disturb their connections with the heating unit.

The conductors 37 for supplying current to the heating unit preferably lead to the respective termianl blocks 30 from one end of the plate 22 and an insulating bushing 38 is provided at that end of the plate with a lead in opening 39 for the conductors. This bushing extends through an opening 40 in a mounting plate 41 which is secured to an extension 21 of the plate 17 by the respective screw 24 and at the inner side of the mounting plate 41 the bushing 38 has a square or rectangular formation embraced by side and bottom flanges 42 and 43 respectively of the plate 41 within which the bushing is retained by a bottom lip 44 and also by the adjoining insulating block 33 and the end portion of the plate 22 with which the upper portion of the bushing is engaged.

As hereinbefore indicated, it is desirable to hold the convolutions of the heating unit parts 11 and 12 in laterally spaced relation and it is also important that these convolutions be securely held against warping or displacement which would distort the top face of the heating unit and impair the uniformity of contact thereof with a pan or cooking utensil thereon. Accordingly a spider 45 is provided under the convolutions of the heating unit with outwardly extending arms 46 to which the convolutions are secured, which said spider consists of a pair of angular members, one of which is shown in Figs. 6 and 7, which are overlapped and secured together at the corners thereof as shown in Figs. 1 and 2 at 47. Preferably a plate 48 is employed in the center opening of the heating unit to carry a name plate and has downturned ears 49 which are cut therefrom, as indicated at 50, and secured to the spider. The name plate 51, which is of a cap like form and covers the spider plate 48, has lugs 52 turned in under the latter plate 48 to attach the name plate thereto.

The spider arms 46 are presented edge-wise to the convolutions and have seats 53 in ther upper edges in which the convolutions are secured, the seats being under cut at their opposite sides to provide overhanging portions 54 which extend inwardly over the convolutions at the opposite sides sufficiently to lock the convolutions in the seats, it being understood that the seats 53 are of such depth that no portions of the arms 46 extend above the convolutions of the heating unit.

To admit the convolutions of the heating unit into the seats 53 certain of the neck portions between adjoining seats 53 are twisted, as indicated at 55 in Figs. 6 and 7, so that a neck portion at one side of each seat is twisted sufficiently to admit the convolution of the heating unit into that seat, and after the convolutions have been inserted into the seats the portions 55 are twisted back into the plane of the respective arm 46 so as to lock the convolutions in the seats. Thus the convolutions are not only held by the spider 45 in proper spaced relation, but are also held in a common plane against displacement which would impair uniformity of contact of the convolutions throughout the area of the heating unit with a flat bottom pan or utensil thereon.

For mounting the heating unit on the top of a range a mounting ring 56 is provided which extends down through an opening 57 in the top 58 of the range and has an annular shoulder therearound resting on the range top 58. This ring 56 is of sheet metal with the shoulder preferably formed by shaping the sheet metal at the upper end to form an outwardly extending flange 59 with a depending margin 60 and this margin preferably has extended portions 61 at intervals around the bottom, for example at three equidistant places, by which the ring is supported on the stove top 58 in a manner to minimize heat conductivity thereto. Likewise the opening 57 of the range top may for the same purpose have similar extensions 62 at intervals to limit the area of contact of the wall of the ring with the range top 58.

The ring 56 is of suitable diameter to loosely embrace the plate 17 and its depending flange 20 and has four indentations 63 equally spaced therearound and extending upwardly from the bottom of said side wall, which said indentations terminate at a distance below the top of the ring to form internal shoulders 64 on which the outer ends of the spider arms 46 rest to support the heating unit 11, 12 at the proper cooking elevation in which the top surface of said unit is slightly above the rim 59 of the mounting ring as shown in Fig. 3.

Notches 65 and 66 are provided in the margin of the plate 17 and its depending marginal flange 20 to accommodate the indentations 63 of the mounting ring and the plate 17 is free to be lifted upwardly in the ring 56 to the top of the latter with the heating unit 11, 12 thereby elevated above the top of the ring 56, all as shown in Fig. 4 to permit access between the plate and heating unit for cleaning, in which elevated position the notches 65 and 66 are above the shoulders 64 and permit a turning movement of the plate to bring unindented portions of the plate flange 20 over the shoulders 64 to rest thereon and hold the plate 17 and heating unit 11, 12 in the elevated cleaning position, it being understood that except in this extreme elevated cleaning position the indentations 63 engage in the notches 65 and 66 and prevent relative turning movement of the plate 17 and ring 56 and when the plate 17 is lowered, insure positioning of the ends of the spider arms directly over the shoulders 64 for engagement therewith. Preferably the notches 66 which are at the bottom of the sloping sides 19 of the plate 17 are elongated as shown particularly in Figs. 2 and 3 to provide ample clearance for drainage of any material that may be spilled on the plate 17.

To permit the above elevational movement of the plate 17 and heating element to the cleaning position and limit both the elevational movement and the relative turning movement in the elevated position, diametrical notches 67 are provided in the wall 56 of the mounting ring to accommodate the heads 25 of the cap screws 24, these notches being of sufficient depth to permit the necessary vertical movement of the cap screw heads for elevation of the plate 17 so that the notches 65 and 66 of its depending flange are slightly above the shoulders 64 of the mounting ring and the notches 67 at the top being wide enough to permit sufficient lateral movement of the cap screw heads for turning movement of the plate to bring unnotched portions of its flange 20 over the shoulders 64 to rest thereon and support the plate 17 and heating unit in the elevated position, the opposite sides of the notches 67 being cut away at 68 to provide clearance for the outwardly projecting portion of the insulating bushing 38.

Thus when this heating unit assembly is mounted on the stove top the normal cooking position is as shown in Fig. 3, at which time the ends of the spider arms 46 rest on the shoulders 64 of the mounting ring indentations 63 and the screw heads 25 are below the notches 67 and the plate 17 and heating unit held against relative turning movement by engagement of the notches 65 of the plate 17 and its flange 20 with the indentations 63 of the mounting ring.

For cleaning the heating unit 11, 12 and its reflector plate 17, the heating unit is merely lifted and at its upper limit is turned in a clockwise direction. The lifting of the heating unit of course, lifts the plate 17 to which the heating unit is attached and as the plate 17 and mounting ring 56 are held against relative rotation by the indentations 63 and notches 65 the heads 25 of the screws 24 are necessarily lifted up into the notches 67 and serve as stops to limit the elevational movement of the heating unit by their engagement with the top margin 69 of the notch, the screw heads then being at one side of their respective notches, for example the screw head 25 shown in Fig. 4 lifts up to the dotted line position indicated at 25ª in Fig. 4. In such position the notches 65 and 66 of the plate 17 and its flange 20 are above the shoulders 64 of the mounting ring indentations 63 so that turning movement of the heating unit 11, 12 and plate 17 is permitted and the combined heating unit 11, 12 and plate 17 is then turned until the heads 25 of the screws engage the opposite sides of their respective notches 67, in which position the screw head 25 of Fig. 4 is at the left hand side of the notch 67 as shown in full lines thereon and upon release of the heating unit the plate 17 will rest on the shoulders 64 thereby holding the plate 17 at the top of the mounting ring 56 and the heating unit at an elevation therefrom as shown in Fig. 4 in which position the plate and under side of the heating unit are readily accessible for cleaning.

To return the parts to the cooking position, the heating unit is merely turned in a counterclockwise direction until the notches 65 and 66 of the plate 17 are in line with the indentations 63 of the mounting ring, at which time the screw heads 25 are at the dotted line position 25ª of Fig. 4, and in this position the plate 17 and heating unit are free to drop down to the normal cooking position of Fig. 3, with the outer ends of the spider arms 46 engaged with the shoulders 64 of the mounting ring.

It is to be understood that while the cleaning adjustment of the heating unit and plate is particularly advantageous when the heating unit is employed for cooking purposes on a range top or in the bottom of an oven where materials are likely to be spilled thereon, it may be used advantageously elsewhere to permit access to the under side of the heating unit and to the surface of the plate which requires a bright, clean surface for effective heat reflection and we contemplate use of the cleaning adjustment as well as other features, such for example as the means for locking the convolutions of the heating unit in place and the terminal facilities for attachment of conductors, in structures other than that shown and described herein as an illustrative embodiment of the invention. Accordingly, while we have shown and described our invention in a preferred form, we are aware that various changes and modifications may be made therein without departing from the principles of our invention, the scope of which is to be determined by the appended claims.

We claim as our invention:

1. In a heating device of the class described, the combination of a relatively flat electrical range heater mounted for elevational adjustment, a reflector pan underlying the heater and having a diametrical elevation from the opposite sides of which the surface of the reflector slopes downwardly, said heater comprising a resistance enclosed in a sheath and said sheath having a plurality of downturned ends which are arranged in diametrical series and extend through the diametrical elevation of the reflector and having the latter swaged thereto.

2. In electric cooking apparatus for assembly to a range platform, the combination of a substantially annular ring having a flange portion resting upon the platform and a downwardly-extending sleeve, said ring being open at its top and bottom, a heating structure disposed within the ring and including a heating element normally disposed in the plane of the platform, and a heat-reflecting disc fixed to the heating element and normally defining with the ring a pan structure beneath the element, a plurality of circumferentially-spaced lugs extending inwardly from the sleeve, a plurality of radially-extending arms aligned substantially with the lugs and resting thereon during normal operation, said disc having a plurality of circumferentially-spaced recesses formed in the periphery thereof and aligned substantially with said arms, and a plurality of outwardly-extending supports carried by the heating structure and disposed beneath the lower edge of the ring for engagement with said ring when the heating structure is moved to an elevated position.

3. In a heating device of the class described, a ring adapted to be supported in a range top opening, a relatively flat electrical heater within said ring and normally positioned at the mouth thereof, means on said ring to support said heater in said normal position but permitting displacement of the heater to an elevated position above the mouth of said ring with the under side of the heater exposed for access thereto, a stop to limit the extent of displacement of said heater, guide means for constantly maintaining the heater in axial alignment with said ring, and means for temporarily supporting said heater in said elevated position above and in axial alignment with said ring.

4. In a heating device of the class described, a skirted ring adapted to be supported in a range top opening and to extend downwardly therefrom, a heating unit assembly within said ring, said assembly including a relatively flat electrical heater and a reflector pan therebeneath and attached thereto in vertically spaced relation, means on said skirted ring to support said assembly within the skirted portion with said heater normally positioned at the mouth of said ring but permitting upward displacement of said assembly to an elevated position where the pan and the underside of the heater are accessible, a stop for limiting the extent of upward displacement of the assembly, and means for temporarily supporting said assembly at said elevation above and in axial alignment with the said normal position.

5. In a heating device of the class described, a skirted ring adapted to be supported in a range top opening and to extend downwardly therefrom, a heating unit assembly within said ring, said assembly including a relatively flat electrical heater and a reflector pan therebeneath and attached thereto in vertically spaced relation, means on said skirted ring to support said assembly within the skirted portion with said heater normally positioned at the mouth of said ring but permitting upward displacement of said assembly to an elevated position where the pan and the underside of the heater are accessible, a stop for limiting the extent of upward displacement of the assembly, guide means on said skirted ring for constantly maintaining said assembly in axial alignment therewith and means for temporarily supporting said assembly at said elevation above and in axial alignment with the said normal position.

6. In a heating device of the class described, a ring adapted to be supported at a range top opening and having a skirt extending downwardly therefrom, a heating unit vertically slidable within said ring and skirt, said assembly including a relatively flat electrical heater and a reflector pan therebeneath and attached thereto in vertically spaced relation, means on said skirt to support said assembly therewithin with said heater normally positioned at the mouth of said ring but permitting upward displacement of said assembly, guide means for preventing rotation of said assembly in its said normal position but permitting at least partial rotation thereof when at an elevated position, and means effective upon rotation of said assembly at an elevated position for temporarily supporting said assembly at said elevated position.

WILLIAM R. TUTTLE.
FRED J. EWALD.